United States Patent [19]
Glosek

[11] 3,725,889
[45] Apr. 3, 1973

[54] LOGIC CIRCUITRY FOR MONITORING THE CYCLIC OPERATIONS OF A PAIR OF DEVICES

[75] Inventor: John J. Glosek, Roselle, N.J.

[73] Assignee: Western Electric Company, Incorporated, New York, N.Y.

[22] Filed: June 4, 1971

[21] Appl. No.: 150,163

Related U.S. Application Data

[62] Division of Ser. No. 1,611, Jan. 9, 1970, Pat. No. 3,624,522.

[52] U.S. Cl. ................... 340/259, 328/160, 340/268
[51] Int. Cl. .................... B65h 63/02, G08b 21/00
[58] Field of Search ............. 340/259, 268; 328/160

[56] References Cited

UNITED STATES PATENTS 3,581,277  5/1971  Beatty et al. ................... 340/268
3,188,619  6/1965  Hemphill et al. ................ 340/259
3,636,364  1/1972  Stempler et al. ................ 340/268

Primary Examiner—John W. Caldwell
Assistant Examiner—Glen R. Swann, III
Attorney—W. M. Kain et al.

[57] ABSTRACT

Logic circuitry is utilized to monitor the continued cyclic operation of a pair of devices, e.g., strand feeding devices. As the devices function a pair of trains of pulses are generated and the logic circuit detects and generates a malfunction signal upon the generation of two pulses within one train without the intervening generation of a pulse in the other train. The logic circuit accepts concurrent generation of pulses, and the subsequent reversal of the lead pulse in the trains without the generation of malfunction signals. Facilities are also provided to allow the devices to commence operation independent of control by the logic circuits.

3 Claims, 3 Drawing Figures

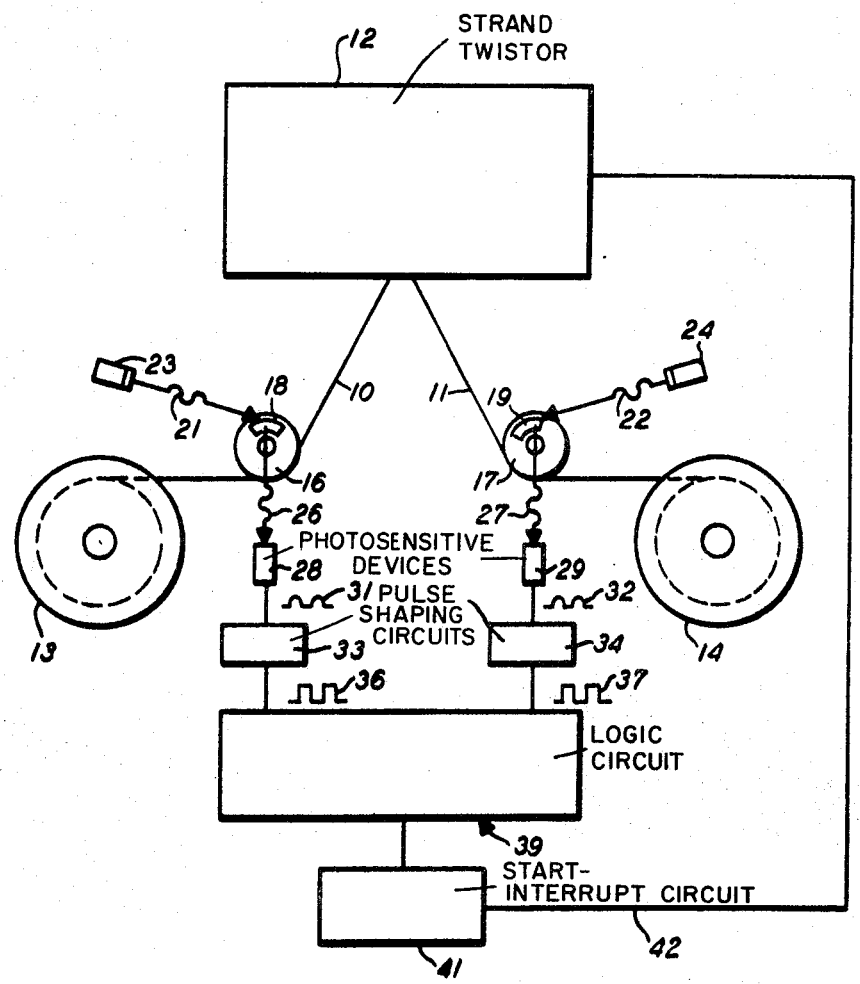

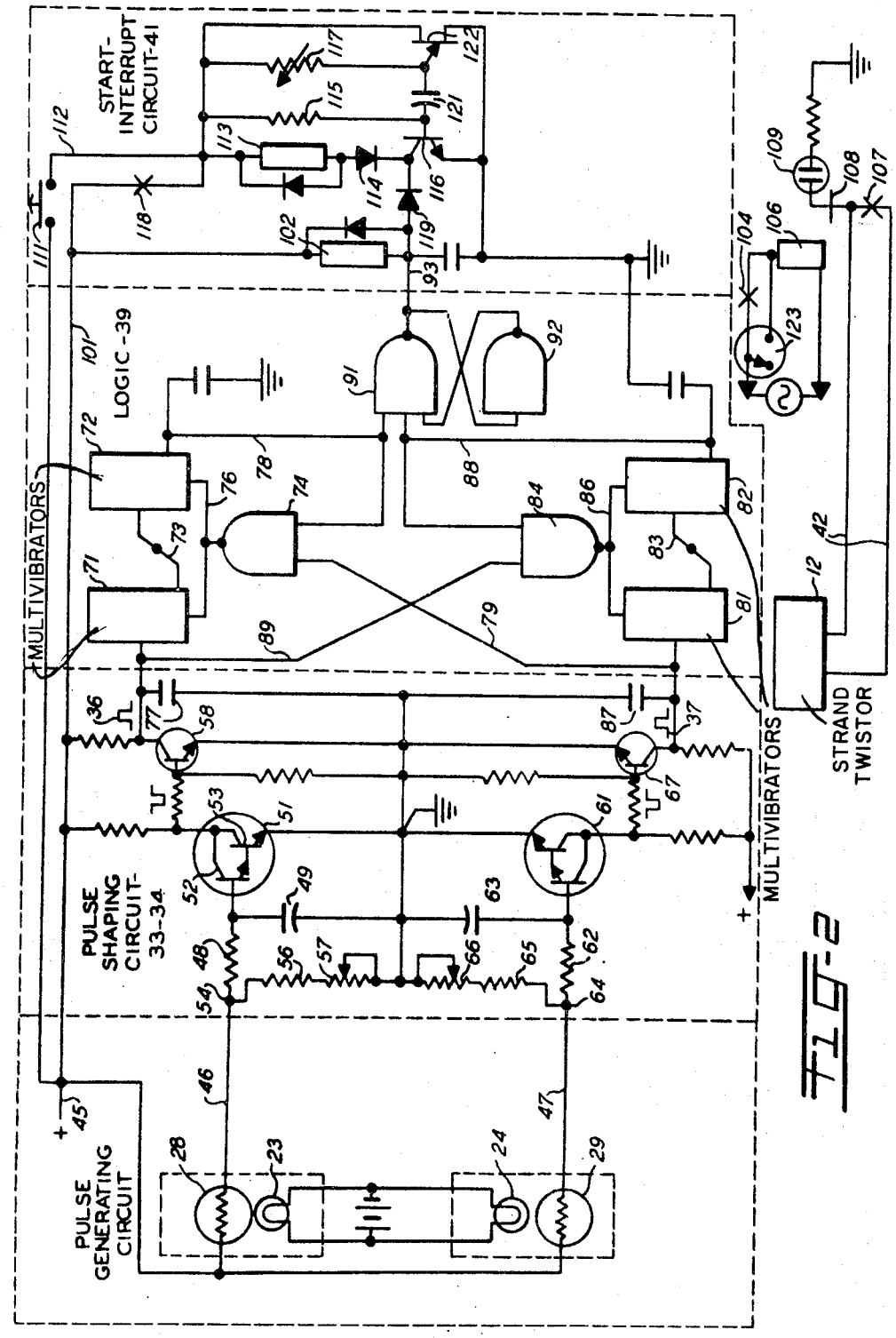

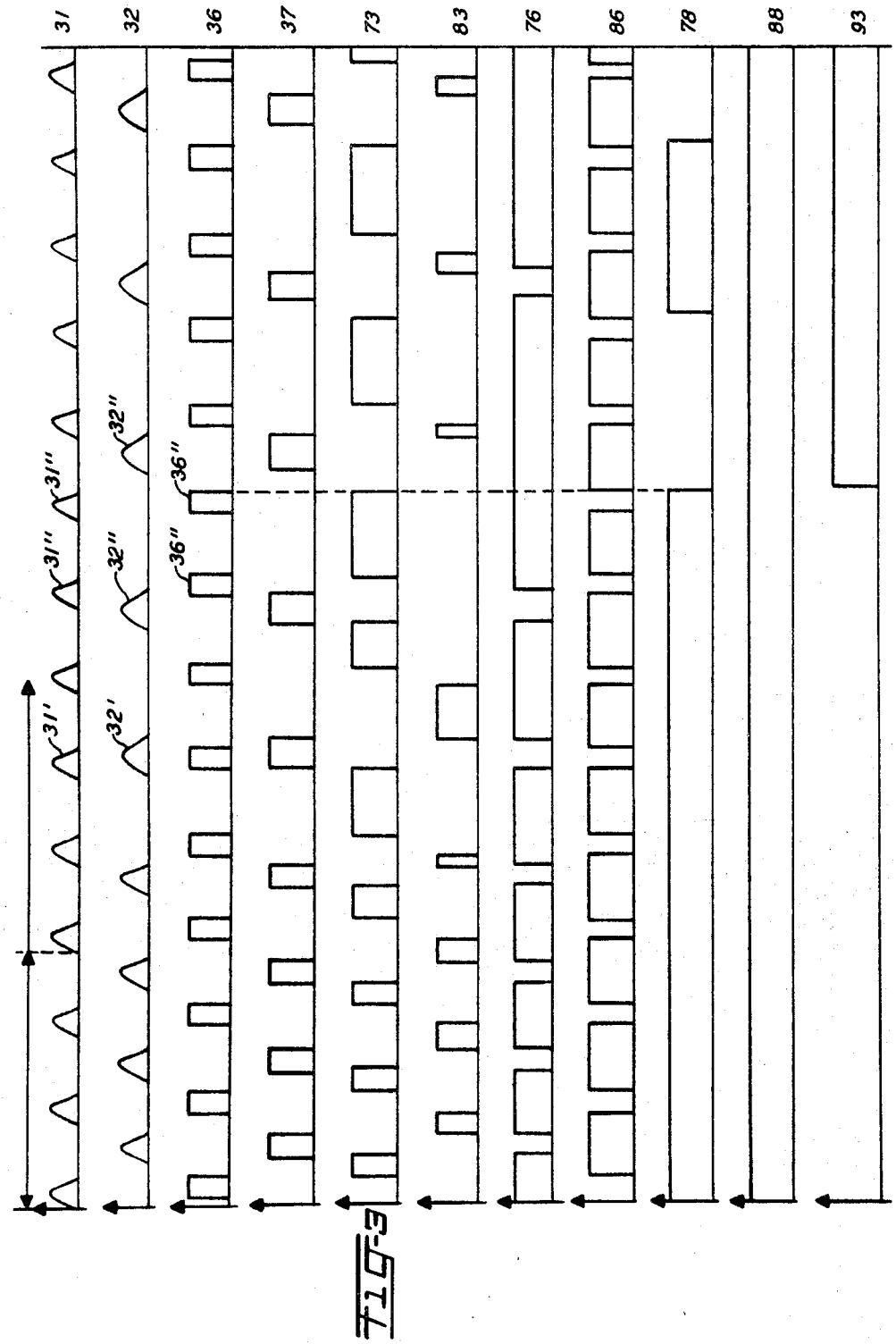

LOGIC CIRCUITRY FOR MONITORING THE CYCLIC OPERATIONS OF A PAIR OF DEVICES

This is a division of application Ser. No. 1,611, filed Jan. 9, 1970 now U.S. Pat. No. 3,624,522.

BACKGROUND OF INVENTION

1. Field of Invention

This invention relates to methods and systems for checking the alternate or concurrent generation of pulses in two trains of pulses, and more particularly, to determining the continuity of two series of pulses generated in response to the rotation of a pair of strand guiding pulleys.

2. Technical Considerations and Prior Art

In many manufacturing operations, it becomes necessary to check the concurrent or alternate operation of a number of cyclically operating instrumentalities. One such manufacturing operation involves the twisting of wire pairs which are subsequently fabricated into multi-wire, twisted pair cables. Obviously, during the simultaneous or sequential twisting of a number of pairs of wire, constant vigilance must be exercised by an attending operator to detect breaks in the wires being twisted. Inasmuch as the wires are advancing and the twisting facilities are rotating, detection of the broken wires becomes extremely difficult. In the situation where a number of wire pairs are being simultaneously twisted in a machine or in a complex of machines, the problem is further compounded in that many of the twisting facilities are not readily visible to the attending operator.

Manifestly, the manufacture of twisted wire cables will be enhanced if facilities could be provided to apprise the attending operator of breaks in the individual wires. In addition, manufacture of the twisted pairs of wire will be enhanced if the facilities were capable of interrupting the operation of the twisting machine upon detection of a break in a wire.

In monitoring the cyclic alternate and/or concurrent operation of these manufacturing instrumentalities, it would be expedient to provide electrical circuitry that produces indicating and/or control signals upon the occurrence of a malfunction or interruption of the cyclic operation of one of the instrumentalities. In the past, systems have been provided to check the difference in frequency of two alternating pulse trains generated in response to the operation of two photoelectric or inductive devices monitoring the functioning of a pair of cyclically operated devices. These systems have included logic detectors to produce an output upon the generation of two pulses within one train without the generation of an intervening pulse in the other train. These logic detectors also produce an output signal upon the concurrent generation of pulses in both trains. However, there is still a need to provide a monitoring or logic circuit that will only produce a malfunction output signal in response to the non-alternate and non-concurrent generation of pulses in both pulse trains. Further, this monitoring circuit should include facilities for eliminating spurious responses to locally generated or induced noise signals.

In these prior art systems, the functioning of the logic detector depends upon a first pulse train always leading a second pulse train by one pulse; that is, a pulse is generated in the first train and then a pulse is generated in the second train whereafter a pulse is always first generated in the first train and then the alternate or second pulse is generated in the second train. In many practical applications, it is desirable to have a system that will accommodate some fluctuation in the generation of pulses such as a switching back and forth of the leading pulses in the first and second trains. In such a system, pulses will be generated alternately in the first train and then in the second train, then there will be a period where there will be concurrent generation of pulses, and finally there will be a period where a pulse is generated first in the second train and then in the first train whereafter the second train leads the first train. With this type of system, the logic detector should only produce an output or malfunction signal when two pulses are generated in one train without the generation of an alternate or intervening pulse in the other train to allow for a limited variance in the operation of the monitored instrumentalities which are initiating the generation of the pulse trains.

SUMMARY OF THE INVENTION

The present invention contemplates a logic circuit that functions to check the relative generation of pulses in a pair of pulse trains which pulse trains are generated by the continued operation of a pair of instrumentalities in a manufacturing facility such as a two wire twistor. The logic circuit includes a pair of logic devices having the capability of producing a malfunction signal only when two pulses are generated in one train without the concurrent or intervening generation of a pulse in the other train. Upon operation of either one of the logic devices, the malfunction signal is generated which is indicative of the interruption of the operation of one of the instrumentalities and this signal may be utilized to interrupt further operation of the manufacturing facility.

More particularly, as each pulse is generated, it is shaped and monitored to produce pulses that are truly representative of the continued operation of the manufacturing facility. If spurious noise or low level extraneous signals are produced or induced in the system they are eliminated. Each logic device is constructed and arranged so that a first stage in each device is operated by the trailing extremity of each applied pulse and a second stage is only operated by the trailing extremity of an output pulse from the first stage. As each pulse is applied to a logic device, the same pulse is also applied to a reset circuit associated with the other logic device so as to reset this other logic device to an initial set condition. It may be thus appreciated that so long as pulses are alternately or concurrently generated in both pulse trains, neither logic device will be operated thus indicating continued, proper operation of both manufacturing instrumentalities. Inasmuch as the logic circuit does not produce a malfunction signal when concurrent pulses are applied, then following the reception of concurrent pulses, the alternate periodic generation of pulses in the two trains may be reversed or the alternate generation may continue in the original sequence.

DESCRIPTION OF THE DRAWING

FIG. 1 is a schematic view of a pair of strand feeding and twisting facilities together with a showing of a pair of pulse generating devices and logic circuits for monitoring the strand feeding operation in accordance with the principles of the invention;

FIG. 2 is a circuit diagram of a logic and control system responsive to a pair of pulse trains for generating a malfunction signal upon failure of one of the strand feeding and twisting facilities shown in FIG. 1; and FIG. 3 is a pulse timing diagram illustrating the relationship between various pulses generated in two trains by the circuit shown in FIG. 2 during normal monitoring of the strand feed.

GENERAL DESCRIPTION

In order to illustrate the principles of the invention, attention is first directed to FIG. 1, wherein there is shown facilities for monitoring the continuous feed of a pair of strands or wires 10 and 11 into a strand twistor 12 where the strands are wrapped one around the other. As the strands advance from supply reels 13 and 14, the strands engage and rotate a pair of freely mounted idler pulleys 16 and 17. The strands may make a convolution or two about the pulleys to insure that the pulleys rotate with the advancing strands. Mounted on the sides of the pulleys 16 and 17 are a pair of light reflecting elements 18 and 19 positioned to cyclically move into the path of light beams 21 and 22 emanating from light sources 23 and 24. As a result of the impingement of the light beams, light flashes 26 and 27 are reflected onto photosensitive devices 28 and 29. These photosensitive devices may be active elements that cause the generation of pulses or they may be light sensitive passive elements such as photo-conductive resistors, which will control the generation of pulses. The reflective elements are angularly offset to each other on the respective axis of the pulleys 16 and 17 so that the light flashes and the resultant pulses are generated in alternating pulse trains 31 and 32 (see also FIG. 3).

The output from the photosensitive devices 28 and 29 are applied to a pair of pulse shaping and noise elimination circuits 33 and 34 so that the rectangular pulses 36 and 37 (see also FIG. 3) are produced which are truly representative of the cyclic operation of the pulleys 16 and 17 and thus are indicative of the advance of the strands 10 and 11.

It is to be understood that pulse generating devices may be utilized other than photo-responsive devices, for example, angularly offset mechanical switches that are cyclically closed upon each revolution of the pulleys, angularly offset magnetic slugs inserted in the side of the pulleys to actuate magnetic pickup devices, etc. In the alternative, the pulleys may be provided with slots which are angularly offset with respect to each other to cyclically interrupt light beams impressed on the pulleys to effectuate the generation of light flashes which may be impinged on photo diodes to cause the generation of the alternating trains of pulses.

The pulse trains 36 and 37 are impressed on a logic circuit generally designated by the reference numeral 39 to control an output device 41 which will provide signals indicative of the interruption of either the pulse train 36 or the pulse train 37, and thus an indication of the interruption of the advance of strands 10 or 11. The signal generated by device 41 is impressed over a lead 42 to actuate interrupter facilities contained within the twister 12.

The logic circuit 39 is designed to produce an output only upon the generation of two pulses within one of the trains 36 or 37 and the failure to produce a pulse in the other train 36 or 37. The circuit also has the capability of continuing to block the pulse trains 36 and 37 upon the concurrent generation of pulses in the trains 36 and 37. In fact, following the concurrent generation of pulses, the alternating sequence in the trains 36 and 37 may be reversed and still the logic circuit will block these pulses.

DETAILED DESCRIPTION - PULSE GENERATING CIRCUIT

Referring to FIG. 2, it will be noted that the light sources 24 and 23 cyclically reflect light flashes in an alternating sequence on light sensitive devices 28 and 29 in the form of photo-conductive resistors. As light falls on these resistors, the resistance values alternately drop so that positive going pulses are impressed alternately on leads 46 and 47. The pulses are positive going because a positive potential voltage source 45 is connected through the resistors 28 and 29 and these resistors are cyclically and alternately decreasing in value upon the impingement of the light flashes. The shape of these pulses is illustrated in FIG. 3 and are designated pulse forms 31 and 32.

PULSE SHAPING CIRCUIT

Considering pulses 31 and 32, it is desirous that these pulses be shaped to have a rectangular configuration and, further, that these pulses be free of any noise or spurious signals. Each pulse 31 is impressed on a low pass filter circuit comprising a resistor 48 and a capacitor 49. If an applied pulse is a spurious spike of short duration, the pulse will not act to charge the capacitor 49 to a value necessary to operate a transistor device 51 which comprises a pair of series transistors 52 and 53 connected as a Darlington pair. If the spurious signal is of a low value, then it is incapable of raising the potential at a junction 54 and, as a result, the transistor device 51 is not operated. The potential level of junction 54 is controlled by voltage divider network, including the photoconductive resistor 28 and a resistor 56 connected to an adjustable potentiometer 57.

Assume that a pulse 31 arrives that is of sufficient level and duration, then capacitor 49 accumulates sufficient charge to control the impression of a positive going potential condition on the base of the transistor 52 to initiate conduction of both transistors 52 and 53. Conduction of these transistors results in a sharp drop in the collector potentials which will be maintained until the transistors 52 and 53 are cut off due to a sufficient drop in potential of the trailing extremity of the applied pulse 31. As a result of this operation, a negative going, rectangular shaped pulse is impressed on the base of a NPN transistor buffer amplifier 58.

In a like manner, pulses produced by the impingement of light and the photo-resistor 29 is impressed on a second Darlington pair 61 associated again with a low pass filter comprising resistor 62 and capacitor 63, as well as a voltage level control comprising the photoconductive resistor 29 connected through junction 64 to a resistor 65 connected to an adjustable potentiometer 66. Also associated with the output of the Darlington pair 61 is a second NPN transistor buffer amplifier 67. Outputs of the amplifiers 58 and 67 are normally positive going rectangular shaped pulses 36 and 37 which are applied alternately to the logic circuit generally designated by the reference numeral 39.

LOGIC CIRCUITS

The logic circuit 39 is arranged to monitor the alternate application of pulses 36 and 37. If the pulses are alternately or concurrently impressed on the logic circuit, the pulses are effectively blocked to preclude the operation of the output responsive device 41. The logic circuit also has the capability of continuing the blocking operation in the situation where there is a reversal in the timing sequence of the application of the impressed pulses 36 and 37 following the impression of one or more sets of concurrent pulses 36 and 37.

Considering pulses 36, these pulses are impressed on a logic device comprising a pair of bistable multivibrators 71 and 72. The multivibrators are interconnected together by a coupling 73 so that two complete operations of the multivibrator 71 results in a single operation of the multivibrator 72. Associated with the multivibrators 71 and 72 is a NAND gate 74 which under prescribed conditions impresses a reset signal on lead 76 to restore both multivibrators to an initial condition. Further, each multivibrator 71 or 72 is designed to respond only to the trailing extremity of an applied pulse. Multivibrators 71 and 72 are commercially available and are known as J-K flip flops. Such flip-flop circuits may be fabricated as an integrated circuit, one such circuit is manufactured by the Motorola Company and is disclosed on page 5-34 through 5-38 of their INTEGRATED CIRCUIT DATA BOOK dated August 1968.

The input of the multivibrator 71 receives the pulses 36 and this input is associated with a capacitor 77 which functions to dissipate short spurious spike-like noise signals that are impressed or induced in the system. In an initial condition, the output impressed on the coupling 73 is at a low potential level. Upon application of the trailing extremity of the pulse 36, the two stages within the multivibrator 71 change state so that a positive going potential condition is impressed on the coupling 73. The first stage of the multivibrator 72 will not respond to this increase in potential, but will only respond upon a subsequent drop in potential on the coupling. The second or output stage of the multivibrator stage of the multivibrator 72 is normally at a high potential level which is impressed over a lead 78 to a first input of the NAND gate 74. The output of the NAND gate impressed on lead 76 is initially at a high potential and is ineffective to control the resetting of multivibrators 71 and 72. If the NAND gate is operated so that the output switches to a low potential, then both multivibrators 71 and 72 are reset to the initial condition. The appearance of a low potential on the lead 76 controls the multivibrators 71 and 72 so that they are non-responsive to any changes in potential applied to their first input stages.

If following the impression of a pulse 36 there is a pulse 37 generated, this pulse is impressed over a lead 79 to the other input of the NAND gate 74. The impression of high potentials over the leads 78 and 79 results in the operation of the NAND gate to drop the potential applied to the lead 76 and, as a result, the multivibrators 71 and 72 are reset. If the pulse 37 is concurrently produced at the same time that the pulse 36 is impressed on the input stage of the multivibrator 71, the NAND gate will again function to reset or to hold the multivibrator 71 in the initial condition. In effect, presence of a low potential on the lead 76 overrides the effect of any change in potential applied to the input or first stages of the multivibrators 71 and 72.

Considering now the application of the pulses 37, they are applied to a J-K flip flop circuit comprising multivibrators 81 and 82 interconnected by a coupling 83. Associated with these multivibrators is a second NAND gate 84 which functions to control the reset of the multivibrators 81 and 82 by controlling the potential impressed on a lead 86. Again, a capacitor 87 is provided to dissipate spurious short, spike-like noise signals. The second or output stage of the multivibrator 82 is connected over lead 88 to the second input of the NAND gate 84. In addition, pulses 36 are impressed over a lead 89 to act in conjunction with the potential impressed on lead 88 to control the NAND gate 84. In summary, it may be appreciated that the logic circuit associated with the impressed pulses 37 is identical with the logic circuitry associated with the impressed pulses 36.

The logic device associated with the pulse trains 36 and 37 are effective to perform their blocking function upon a reversal in the time sequence in the applied pulses 36 and 37 following the application of concurrent pulses 36 and 37 to the multivibrators 71 and 81. More particularly, assume first that the pulses 36 are leading the pulses 37 and that the sequence of pulses 37 gradually increase so that concurrent pulses 36 and 37 are impressed on the multivibrators 71 and 72. As previously explained, the concurrent application of pulses results in the operation of both NAND gates 74 and 84 to reset all of the multivibrators. If the frequency of pulses 37 increases so that pulses 37 now lead pulses 36, then the logic circuits will reverse their cyclic operation and continue to block the pulses in the new time sequence so long as the pulses 37 and 36 are alternately impressed.

If, however, a situation arises where two pulses in either pulse train are generated and impressed on either of the multivibrators 71 or 81, without the intervening generation and impression of a pulse in the other train, there is a second change in potential impressed on the coupling 73 or 83 to change the operating states of the stages in either the multivibrators 72 or 82. As a result, there is a drop in potential impressed on either lead 78 or 88 which functions to interrupt the operation of the NAND gate 74 or 84. This drop in potential impressed on either lead 78 or 88 is also utilized to control the generation of a signal which may be used to interrupt the operation of the monitored instrumentality, such as the twistor 12.

It will be recalled that under normal operating conditions, the potential on leads 78 and 88 are at a high value. These high potentials are applied to a NAND gate 91. The output of the NAND gate is normally at a low level which is impressed on a NAND gate 92 which functions to invert the applied voltage so that its output potential is high. This high potential is also impressed on an input to the NAND gate 91. Upon any one of the inputs to the NAND gate 91 changing from a high value to a low value, the NAND gate will function so that an increased potential is applied on an output lead 93. It may be thus appreciated that a change in potential impressed on either lead 78 and 88 due to the operation of the second stages of either the multivibrators 72 and 82 will result in an operation of the NAND gate 91.

Upon operation of the NAND gate 91, the output potential goes to a high value which is impressed on the NAND gate 92 to invert its output and impress a low potential on the NAND gate 91, thus, locking the NAND gate 91 to impress a continual high potential condition on the output lead 93.

START - INTERRUPT CIRCUIT

The high potential output impressed on lead 93 from the NAND gate 91, indicative of a malfunctioning of one of the strand feeding operations, is used to control facilities which function to interrupt further operation of the strand twistor. Under normal operating conditions, the potential at the output of the NAND gate is at a low level and current flows from the energy source 45 over a lead 101 through a coil of a relay 102, over the lead 93 to the output of the NAND gate 91. When the NAND gate 91 switches so that the output is high, then high potential conditions are applied to both ends of the coil of the relay 102 and, as a result, current ceases to flow. The relay 91 is thus de-energized to open contacts 104 connected in an energization circuit for a heavy duty relay 106. De-energization of relay 106 results in the opening of contacts 107 contained in a power control circuit for the twistor 12, thereby interrupting further operation of the twistor. De-energization of the relay 106 also allows contacts 108 to close completing an energization circuit to a signal glow tube 109 which illuminates to apprise an attending operator that there has been a break in one or the other of the strands 10 or 11.

Upon repair of the strand break or upon an initial start up of the twistor, it may be necessary to bypass the logic circuit 39 until the twistor is brought up to a normal operating speed. During the initial start up period, there will be abnormal fluctuations in the strand feed, thus, if the logic circuit 39 is connected to monitor the pulse trains, there is a good possibility that a false indication of strand break would be detected to operate the interrupt circuit. Further, during the initial start up period, it is necessary to erase any previous memory that may exist in any of the modules of the logic circuit 39.

Initiation of the operation of the twistor 12 is attained by momentarily depressing a start button 111 to apply positive potential from the source 45, over a lead 112, through the coil of a relay 113, through a diode 114 to a collector of a NPN transistor 116. This positive potential is also impressed through a resistor 115 to a base of the transistor 116. Inasmuch as the emitter of the transistor 116 is connected to ground, this transistor is biased into a state of conduction. Conduction of transistor 116 is accompanied by an energization of the relay 113 which closes contacts 118 to complete a bypass locking circuit to the source of energy 45. Closure of the contact 118 completes an added path for the current to the base of the transistor 116.

Conduction of transistor 116 completes an energizing circuit for the relay 102, which may be traced from source 45, over lead 101, through the coil of relay 102, through a diode 119, through conducting transistor 116 to ground. Energization of relay 102 draws up contacts 104 to energize relay 106 which functions to close contacts 107 in the power circuit for the twistor 12.

This auxiliary start circuit is maintained energized for a sufficient period of time to enable the twistor to advance to a normal operating speed. More specifically, conduction of transistor 116 is also accompanied by a charging of a capacitor 121 through the resistor 117. After a period of time, determined by the time constant of the resistor 117 - capacitor 121 and sufficient to enable the twistor 12 to assume normal operating speed, the capacitor 121 accumulates sufficient charge to apply a firing potential to an emitter electrode of a unijunction transistor 122. Firing of transistor 122 applies the potential of capacitor 121 across the base-emitter circuit of the transistor 116 causing this transistor to be rendered non-conductive thereby releasing the relay 113. During this period of time, set by the values of the resistor 117 and the capacitor 121, the twistor 12 advances to the operating speed and alternating pulse trains 31 and 32 will be generated to set the various modules of the logic circuit in a proper state for subsequent detection of malfunctions in the feed of the strands 10 and 11.

It will be noted that the energizing circuit for the relay 106 is provided with a manual switch 123 to enable operation of the twistor 12 independent of control by the logic circuit 39.

SUMMARY OF OPERATION

Recapitulating on the operation of the system, attention is directed to FIG. 3 which will be considered in conjunction with FIGS. 1 and 2. As the strands 10 and 11 continually advance, alternating trains and pulses 31 and 32 are generated. These pulses are reshaped by circuits 33 and 34 into rectangular-shaped pulses 36 and 37. Each pulse 36 is applied to the logic circuit and the trailing extremity of each of these pulses switches the operating states of the multivibrator 71 to impress an increased potential condition on the coupling 73. Following application of a pulse 36, a pulse 37 is impressed on the NAND gate 74 to drop the potential appearing on the lead 76 to reset the multivibrator 71 to the initial state. As a result, there is no change in potential impressed on the lead 78. In a like manner, the alternate impression of pulses 37 and 36 on the multivibrator 81 and NAND gate 84 are ineffective to change the output potential impressed on the lead 88.

Now assume that there is a break in strand 11 so that pulses 31 are generated at a constant rate while pulses 32 are generated at a progressively slower rate. It will be noted that when pulses 31' and 32' are generated concurrently, the multivibrator 71 is still reset prior to the impression of a second pulse 36 so that the multivibrator 72 is not operated. However, as the rate of generation of the pulses 32 continues to decrease there will come a time when two pulses 31" are generated within the period of time that two pulses 32" are generated. The successive appearance of two pulses 36" effectuates a double operation of the multivibrator 71 so that a trailing extremity of a pulse impressed on the coupling 73 is impressed on the multivibrator 72 to change its states of operation whereupon the potential impressed on the lead 78 drops. The drop in potential on the lead 78 is effective to control the NAND gate 91 to impress an increased potential on the output lead 93. The increased potential on lead 93 is effective to interrupt the energization of the relay 102 whereupon the relay 106 is de-energized to open contacts 107 to thereby interrupt the power circuit for the twistor 12. At this time the contacts 108 close to illuminate the glow tube 109 to apprise the attending operator that there has been a break in one of the strands.

It is to be understood that the above-described arrangements of circuits and construction of elemental modules are merely illustrative of the invention and that many other modifications may be made without departing from the invention.

What is claimed is:

1. In an apparatus for detecting the presence of a pair of strands during strand feeding operations, a pair of pulleys, means for feeding the strands into engagement with said pulleys to rotate the pulleys, means responsive to the rotation of the pulleys for generating a pair of trains of pulses wherein the pulses in one train alternate with the pulses in the other train, normally unoperated means for producing a signal indicative of the failure of one strand to rotate the associated engaged pulley, means responsive to the successive generation of two pulses in one train without either the concurrent or the intervening generation of a pulse in the other train for generating a control signal to operate and signal producing means, and means responsive to each alternately generated pulse and to each concurrently generated pulse for resetting said generating means to block the generation of said control signal.

2. In an apparatus as set forth in claim 1 wherein said control signal generating means comprises, a pair of pulse responsive devices having two coupled stages, the first of which changes state upon the application of a pulse and second of which changes state upon two changes in state of its associated first stage, and wherein said resetting means comprises, means for directing pulses from one train to the first stage associated with the other train and for resetting said first stages prior to the successive operation of said first stage in response to the application of the next successive pulses.

3. In a system for monitoring pulses generated by the cyclic operation of a pair of instrumentalities:

means responsive to the cyclic operation of said instrumentalities for generating a pair of trains of alternating pulses;

a pair of logic circuits for receiving said pair of trains of pulses, each of said logic circuits including a pair of interconnected resettable devices that are successively operated upon application of two pulses for producing an output pulse;

a circuit making device for controlling the operation of the pair of instrumentalities, a control circuit including a gating circuit for energizing said circuit making device;

means responsive to each alternating pulse in said trains for resetting the logic means associated with the other train to block the generation of an output pulse;

means for applying an output pulse to said gating circuit to interrupt said control circuit to de-energize circuit making device and interrupt the operation of the instrumentalities;

an auxiliary start circuit including an electronic device for energizing said circuit making device independent of said gating circuit;

means for energizing said electronic device to energize said circuit making device; and means responsive to the energization of said electronic device and rendered effective after a predetermined time delay for de-energizing said electronic device to again render the gating circuit effective to control said circuit making device.

* * * * *